United States Patent [19]

Hines et al.

[11] Patent Number: 4,614,444
[45] Date of Patent: Sep. 30, 1986

[54] BEARING SEAL ASSEMBLY

[75] Inventors: John R. Hines; Raymond J. Monroe, both of Cadillac; Danny R. Ruppel, Lake City, all of Mich.

[73] Assignee: Cadillac Rubber & Plastics, Inc., Cadillac, Mich.

[21] Appl. No.: 752,464

[22] Filed: Jul. 5, 1985

[51] Int. Cl.⁴ .................. F16C 17/02; F16C 33/74
[52] U.S. Cl. .................................................. 384/138
[58] Field of Search ............ 384/138, 125, 299, 300, 384/901; 308/DIG. 4; 277/51

[56] References Cited

U.S. PATENT DOCUMENTS

| | | |
|---|---|---|
| 1,879,287 | 9/1932 | Johnson . |
| 2,704,230 | 3/1955 | Röschlau . |
| 3,086,826 | 4/1963 | Gunnell . |
| 3,231,460 | 1/1966 | Andrews ........................ 384/300 |
| 3,239,281 | 3/1966 | White .............................. 384/299 |
| 3,727,279 | 4/1973 | Abel . |
| 4,025,132 | 5/1977 | Watanabe . |
| 4,133,587 | 1/1979 | Kume . |
| 4,185,880 | 1/1980 | Shiomi et al. . |
| 4,204,718 | 5/1980 | Bosco . |
| 4,415,166 | 11/1983 | Beia .................................. 277/51 |

Primary Examiner—Lenard A. Footland
Attorney, Agent, or Firm—Varnum, Riddering, Schmidt & Howlett

[57] ABSTRACT

A bearing seal assembly (10) provides a seal and a low-friction bearing between a shaft (18) and a housing (20); and includes a relatively flexible annular seal (12) circumscribing the shaft (18), a low friction race (14) circumscribing and nonrotatably mounted to the seal (12) and a low friction case (16) rotatably housing the seal (12) and the race (14). The bearing seal assembly can be used to seal the annular area between an automotive steering column and an automotive body.

10 Claims, 4 Drawing Figures

BEARING SEAL ASSEMBLY

FIELD OF THE INVENTION

This invention relates to bearing seals between a housing, such as an automobile body, and a rotatable shaft, such as an automobile steering column. In one of its aspects, the invention relates to a shaft bearing seal having a relatively flexible seal and a relatively low resistance to rotation of the shaft with respect to a housing.

BACKGROUND OF THE INVENTION

A seal assembly between a steering shaft and an automobile body should form a tight seal between the shaft and the body to seal one side of the body with respect to the other and be relatively frictionless to permit free rotation of the seal, along with the shaft, relative to the body. In addition, when it is desired to provide a frictionless bearing and seal for a telescoping steering-wheel shaft, the assembly should also permit the shaft to move axially with respect to the body.

Although bearing seals have been available in the past, these seal assemblies are generally made of a two-part construction and are not particularly adapted to provide a seal and low-friction bearing between a housing and a shaft adapted to move axially with respect to the housing, For example, the U.S. Pat. No. 4,204,718, to Bosco issued May 27, 1980, discloses a bearing assembly for supporting a high-speed rotating shaft. The assembly comprises a sleeve bearing circumscribing and rotatably receiving and supporting the shaft and a carrier circumscribing the sleeve bearing and press-fit into a housing to prevent rotation of the carrier relative to the housing. In addition, the U.S. Pat. No. 4,415,166, to Beia issued Nov. 15, 1983, discloses a bearing seal assembly adapted for use between an automobile body and a non-telescoping steering-wheel shaft. The assembly comprises a T-shaped, in cross-section, annular race circumscribing the shaft and having an integrally formed frusto-conical lip which seals against the shaft and a pair of annular rings which snap-fit together to form a cavity for housing the T-shaped race so as to provide rotation of the race relative to the rings. Although this construction is satisfactory for most applications, the seal which is relatively flexable has a coefficient of friction somewhat higher than the outer race which is relatively harder. The frictional resistance of the bearing, although relatively low and satisfactory for many applications, may nevertheless be somewhat higher then desirable for some applications such a collapsing stearing wheel columns.

SUMMARY OF THE INVENTION

In contrast to the foregoing references, this invention comprises a bearing seal assembly having a relatively low coefficient of friction, yet having a relatively flexable seal. The assembly includes an outer race having a relatively low coefficient of friction, adapted to mount within a housing and forming an outer bearing; and an inner race rotatably mounted within the outer race and adapted to circumscribe and seal against a shaft. The inner race includes an inner annular member formed of a relatively flexible material to enable the inner annular member to seal against the shaft yet slide longitudinally on the shaft. The inner race also includes an outer annular member having a relatively low coefficient of friction with respect to the inner annular member so as to enable the outer annular member to rotate relatively friction free within the outer race.

In the preferred embodiment, the inner annular member and the outer annular member are two separate members nonrotatably mounted to one another. To this end, the assembly further comprises a securing means for nonrotatably securing the inner annular member to the outer annular member and comprising a plurality of studs on axial ends of the inner annular member and a number of flanges on axial edges of the outer annular member, whereby the flanges interfere with rotational movement of the studs to prevent rotation of the inner annular member with respect to the outer annular member. Alternatively, the inner annular member can be nonrotatably secured to the outer annular member by any other suitable mechanical means such as by an adhesively bonded connection between the two members. It is contemplated, however, that the inner annular member and the outer annular member can be integral with one another.

The inner annular member can be made of many different materials. The material, however, will be relatively flexible, that is, having durometer in the range of 44 (Shore D) to 63 (Shore D), preferably about 55 (Shore D) and can be made of an elastomer, such as a polyester elastomer.

The outer annular member can also be made from a wide range of materials but is generally much harder than the inner annular member and has a significantly lower coefficient of friction. The outer annular member typically is made of moldable self-lubricating polymers having a durometer in the range of R115 (Rockwell) to R121 (Rockwell), preferably R118 (Rockwell). Self-lubricating polymers of the nylon variety are preferable.

The outer race can also be made of a wide range of materials. The outer race is also typically made from a moldable polymer which is relatively hard and has self-lubricating properties. Typically, the durometer of the outer race is in the range of R64 (Rockwell) to R121 (Rockwell), preferably about R96 (Rockwell). A self-lubricating acetal is the preferred material.

BRIEF DESCRIPTION OF THE DRAWINGS

The invention will now be described with reference to the drawings in which.

DESCRIPTION OF THE PREFERRED EMBODIMENTS

Figure 1:
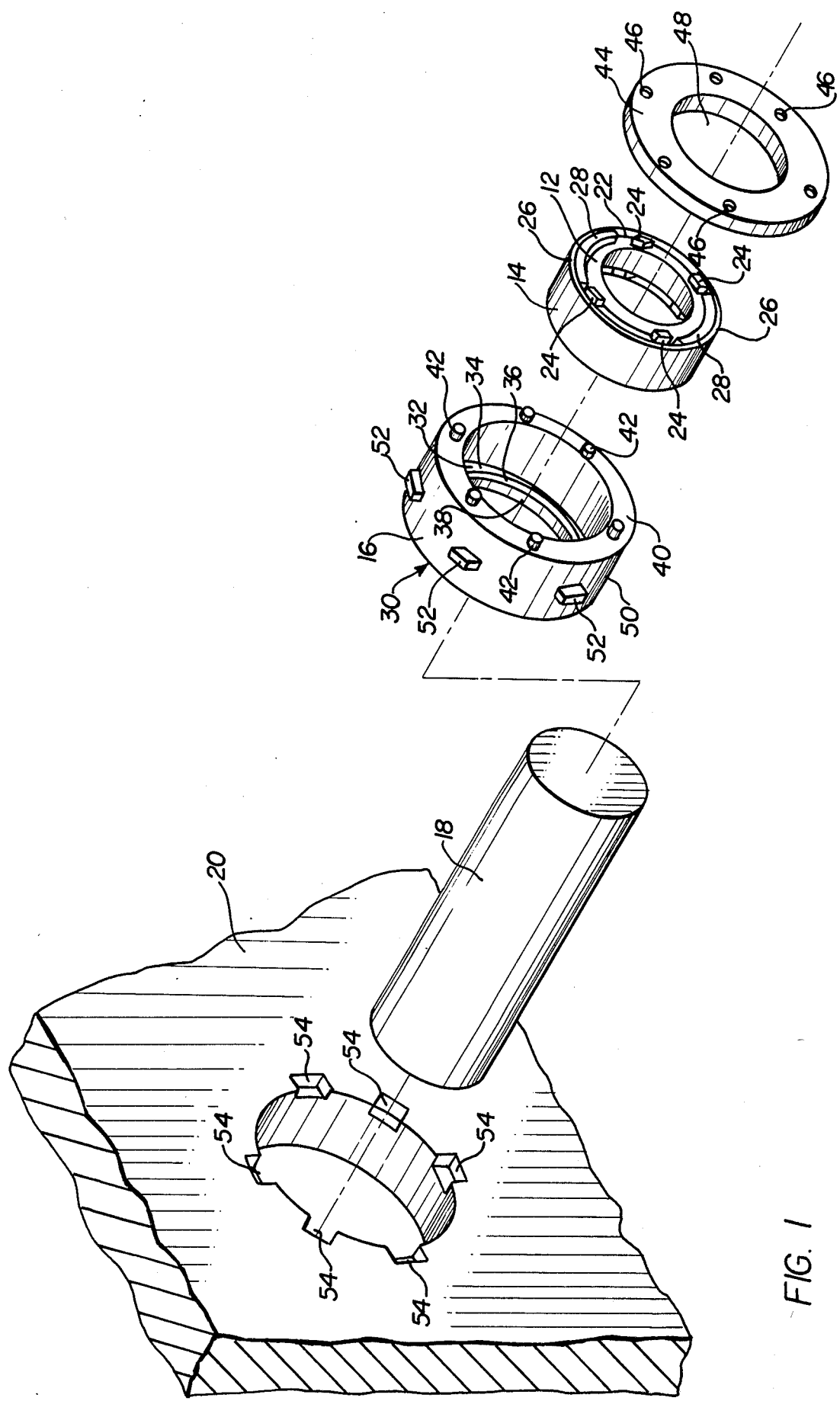
FIG. 1 is an exploded front perspective view of the bearing seal assembly of the invention.
Figure 3:
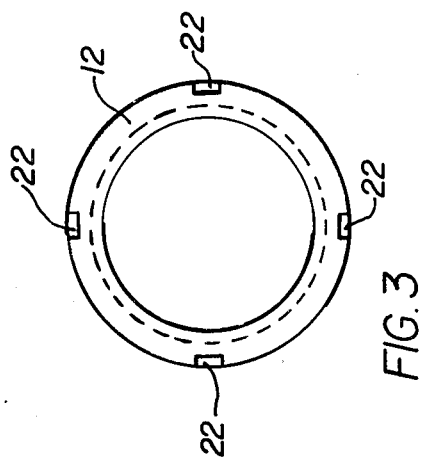
FIG. 3 is a front elevational view of the seal member of the bearing seal assembly shown in FIGS. 1 and 2.
Figure 4:
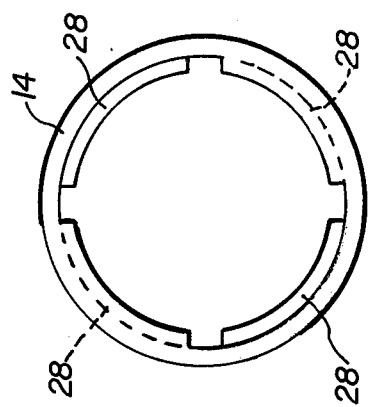
FIG. 4 is a front elevational view of the race of the bearing seal assembly shown in FIGS. 1 and 2.
Figure 2:
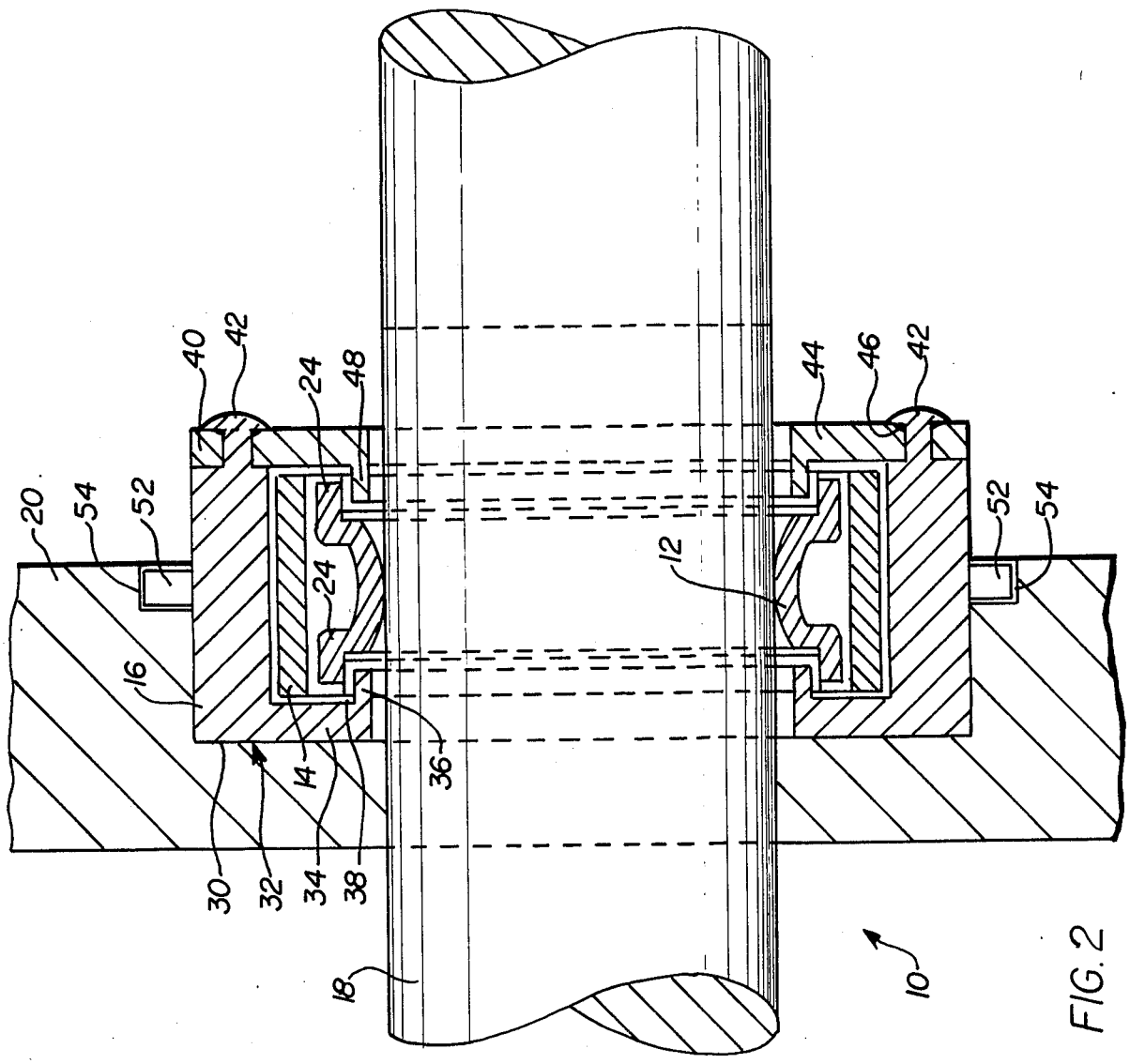
FIG. 2 is a cross-sectional view of the bearing seal assembly shown in FIG. 1.

Referring to the drawings, there is shown a bearing seal assembly 10 comprising an inner race 11 and an outer race or case 16. The inner race is formed of an annular seal 12 and a race 14 circumscribing and engaging the seal 12 for nonrotatable movement with respect thereto. The outer race or case 16 rotatably mounts the inner race 11. The bearing seal assembly 10 provides a seal and a relatively low-friction bearing between a shaft 18 such as an automobile steering shaft, and a support housing 20, such as an automobile body.

The seal 12 is an annular member which circumscribes and snugly engages the shaft 18. The seal has, on each axial end 22 thereof, a plurality of axially-projecting studs 24. The race 14 is also an annular member, circumscribes and engages the seal and has, on each axial edge 26 thereof, a pair of inwardly-projecting radial flanges 28. The flanges interfere with the studs 24 of the seal 12 to prevent rotational movement of the seal with respect to the race 14.

In the preferred embodiment, the race 14 and the seal 12 are formed of two separate members, with the former circumscribing and nonrotatably mounted to the latter in the manner described above. It is contemplated, however, that the race may be nonrotatably mounted to the seal by any other suitable mechanical means, such as by gluing or cementing. Alternatively, the race and seal may be integral with one another.

The case 16 has, on its forward axial side 30, a retaining member 32 extending 360° around the case and comprising an inwardly directed ledge 34 and a rearwardly-projecting lip 36 integral with the inner end 38 of the ledge 34. On its rearward axial side 40, the case has a number of rearwardly-projecting tabs 42. The seal 12 and race 14 are housed within the case 16 such that the race, and seal engaged therewith, rest on the ledge 34. In this configuration, the retaining member functions to limit forward axial movement of the interlocking seal and race with respect to the case.

A case cover 44 has a series of holes 46 corresponding in number to, aligned with and engaging the rearwardly-projecting tabs 42 of the case 16. In the preferred embodiment, the tabs 42 are heat-staked to the cover 44 so that the cover is permanently retained on the case 16. It is contemplated, however, that the cover can be sealed to the case by any other suitable means, such as by gluing or solvent welding. In addition, the cover has a rearwardly projecting tongue 48 extending 360° around the cover and functioning, along with the retaining member 32, to secure the seal and race within the case. The case 16 also includes, on the outside perimedal surface 50 thereof, a plurality of outwardly-extending projections 52 for securely positioning the assembly 10 in the housing 20. Indentations or slots 54 in which engage the projections 50 of the case 16 are formed in the housing to receive the projections 52.

The bearing seal assembly 10 is particularly adapted to provide a relatively frictionless bearing and seal for a steering wheel shaft that is telescoping. Thus, the assembly 10 permits the shaft 18 to move axially with respect to the housing 20, while at the same time providing a tight seal against the shaft 18 and permitting free rotation of the seal 12, along with the shaft 18, relative to the housing 20.

To this end, an assembly with the above-stated three-part construction is employed and includes the following properties. Specifically, the seal 12 is formed of material that is relatively flexible, that is has a relatively low durometer, within the range of 44 (Shore D) to 63 (Shore D), preferably 55 (Shore D), but yet is able to slide longitudinally on the shaft 18. Plastic is the preferred material because it maintains a good seal while at the same time sliding fairly easily on the shaft. The polyester elastomer marketed under the trade name DuPont Hytrel No. 5526 may be utilized.

The race 14 and case 16 are preferably made of compositions having relatively low coefficients of friction and high durometers with respect to the seal so that the race can rotate relatively friction-free with respect to the case. For example, the race 14 can have a durometer in the range of R115 (Rockwell) to R121 (Rockwell), preferably R118 (Rockwell). The case 16 can have a durometer in the range of R64 (Rockwell) to R121 (Rockwell), preferably about R96 (Rockwell). Specifically the race may be made from a general purpose self lubricating nylon, such as type 6-6 nylon. In addition, the case may be formed of a self lubricating acetal composition, preferably of the type sold under the trademark DuPont Derlin 500. A Celcon material would also be acceptable. The nylon/derlin combination produces a good low-friction bearing combination. The invention, however, can also be constructed by reversing the nylon and derlin, i.e. with the race being formed of derlin and the case being formed of nylon, for the properties of the two materials are similar.

In this manner, the race 14 and the seal 12, although not force-fit with respect to each other, nevertheless are nonrotably mounted with respect to each other. On the other hand, the race and seal combination rotates freely within the bearing case 16. Thus, a seal is formed between the shaft 18 and the housing 20 and has a relatively frictionless bearing to permit free rotation of the shaft relative to the housing and to seal one side of the housing with respect to the other.

While the invention will be described in connection with a preferred embodiment, it will be understood that I do not intend to limit the invention to that embodiment. To the contrary, I intend to cover all alternatives, modifications and equivalents as may be included within the spirit and scope of the invention as defined by the appended claims.

The embodiments of the invention in which an exclusive property or privilege is claimed are defined as follows:

1. A bearing seal assembly comprising an outer race adapted to mount within a housing, forming a bearing and having a relatively low coefficient of friction; and an inner race rotatably mounted within the outer race and adapted to circumscribe and seal against a shaft; wherein the improvement comprises:
    an outer race made of a molded polymer having a durometer in the range of R64 (Rockwell) to R21 (Rockwell);
    an inner race comprising an inner annular member of a relatively flexible nature to seal against the shaft, yet slidable longitudinally on the shaft, and made of a molded polymer having a durometer in the range of 44 (Shore D) to 63 (Shore D); and an outer annular member of a relatively low coefficient of friction with respect to the inner annular member so as to enable the outer annular member to rotate relatively friction free within the outer race and made of a molder polymer having a durometer in the range of R115 (Rockwell) to R121 (Rockwell); and
    a securing means for nonrotably securing the inner annular member to the outer annular member.

2. A bearing seal assembly according to claim 1, wherein the inner annular member is made of an elastomer; the outer annular member is made of a self-lubricated plastic; and the outer race is made of a self-lubricated plastic.

3. A bearing seal assembly according to claim 2, wherein the inner annular member is made of a polyester elastomer; the outer annular member is made of a self-lubricating nylon; and the outer race is made of a self-lubricating acetal polymer.

4. A bearing seal assembly according to claim 3, wherein the securing means comprises a plurality of studs on axial ends of the inner annular member; and a number of flanges on axial edges of the outer annular member; the flanges interfering with rotational movement of the studs to prevent rotation of the inner annular member with respect to the outer annular member.

5. A bearing seal assembly according to claim 3, wherein the securing means comprises an adhesively bonded connection between the inner annular member and the outer annular member.

6. A bearing seal assembly comprising an outer race adapted to mount within a housing, forming a bearing and having a relatively low coefficient of friction; and an inner race rotatably mounted within the outer race and adapted to circumscribe and seal against a shaft; where the improvement comprises:
   an outer race made of a molded polymer having a durometer in the range of R64 (Rockwell) to R121 (Rockwell); and
   an inner race comprising an inner annular member of a relatively flexible nature to seal against the shaft, yet slidable longitudinally on the shaft, and made of a molded polymer having a durometer in the range of 44 (Shore D) to 63 (Shore D); and an outer annular member of a relatively low coefficient of friction with respect to the inner annular member so as to enable the outer annular member to rotate relatively friction free within the outer race and made of a molded polymer having a durometer in the range of R115 (Rockwell) to R121 (Rockwell).

7. A bearing seal assembly according to claim 6, wherein the inner annular member is made of an elastomer; the outer annular member is made of a self-lubricated plastic; and the outer race is made of a self-lubricated plastic.

8. A bearing seal assembly according to claim 7, wherein the inner annular member is made of a polyester elastomer; the outer annular member is made of a self-lubricating nylon; and the outer race is made of a self-lubricating acetal polymer.

9. A bearing seal assembly according to claim 8, wherein the inner annular member and the outer annular member are integral with one another.

10. A bearing seal assembly comprising an outer race adapted to mount within a housing, forming a bearing and having a relatively low coefficient of friction; and an inner race rotatably mounted within the outer race and adapted to circumscribe and seal against a shaft; wherein the improvement comprises:
   an inner race comprising an inner annular member of a relatively flexible nature to seal against the shaft, yet slidable longitudinally on the shaft; and an outer annular member having a relatively low coefficient of friction with respect to the inner annular member so as to enable the outer annular member to rotate relatively friction free within the outer race; and
   a securing means for nonrotatably securing the inner annular member to the outer annular member and comprising a plurality of tuds on axial ends of the inner annular member and a number of flanges on axial edges of the outer annular member, the flanges interfering with rotational movement of the studs to prevent rotation of the inner annular member with respect to the outer annular member.

* * * * *